United States Patent [19]

Riley

[11] Patent Number: 4,861,045
[45] Date of Patent: Aug. 29, 1989

[54] DUST EXCLUDER FOR VEHICLE AIR CONDITIONING COMPRESSOR SEAL ASSEMBLY

[75] Inventor: William M. Riley, Milan, Mich.

[73] Assignee: Mather Seal Company, Milan, Mich.

[21] Appl. No.: 207,822

[22] Filed: Jun. 16, 1988

[51] Int. Cl.$^4$ .............................................. F16J 15/42
[52] U.S. Cl. ...................................... 277/25; 277/152; 277/DIG. 4
[58] Field of Search ............... 277/152, 153, 182, 183, 277/184, 84, DIG. 6, 65, 89, 25, DIG. 4

[56] References Cited

U.S. PATENT DOCUMENTS

| | | | |
|---|---|---|---|
| 2,272,650 | 2/1942 | Von Veh | 277/153 |
| 3,567,230 | 3/1971 | Gits | 277/89 |
| 4,376,541 | 3/1983 | Walter et al. | 277/153 |
| 4,427,202 | 1/1984 | Backlin | 277/65 |
| 4,583,749 | 4/1986 | Hatch | 277/152 |
| 4,643,439 | 2/1987 | Lewis et al. | 277/152 |

*Primary Examiner*—William A. Cuchlinski, Jr.
*Assistant Examiner*—Jeff Hohenshell
*Attorney, Agent, or Firm*—Lawrence J. Shurupoff

[57] ABSTRACT

A dust excluder (12) for a seal assembly (10) such as utilized with a vehicle air conditioning compressor is disclosed as having an annular inner portion (36) that mounts on a rotatable compressor shaft (20) and as including an outer portion (38) that seals with an annular support (24) of the seal assembly axially outward from a shaft seal (30) in a manner that excludes dust to prevent seal abrasion without increased heating of the compressor shaft. The inner portion (36) of the dust excluder is preferably embodied by an annular body (56) having opposite axial ends (58,60) and the outer portion (38) is preferably embodied by a sealing section (62) having a disc (64) extending outwardly from the annular body (56) and by a sealing lip (66) extending outwardly from the disc for slidable engagement with the annular support (24). The sealing lip (66) is preferably inclined and has an edge junction that provides an annular line contact (68) with the annular support (24).

9 Claims, 1 Drawing Sheet

DUST EXCLUDER FOR VEHICLE AIR CONDITIONING COMPRESSOR SEAL ASSEMBLY

TECHNICAL FIELD

This invention relates to a dust excluder for a seal assembly and particularly concerns a seal adapted for use in a vehicle air conditioning compressor.

BACKGROUND ART

U.S. Pat. Nos. 4,583,749 Hatch and 4,664,392 Hatch, which are assigned to the assignee of the present invention, disclose a seal assembly including a polytetrafluoroethylene (PTFE) seal that is utilized with a vehicle air conditioning compressor. Such air conditioning compressors conventionally include a rotary shaft which extends outwardly from a refrigerant chamber that is enclosed by the seal about the shaft to maintain refrigerant and lubricating oil within the chamber. This shaft permits rotary driving of the compressor for its operation. In certain environments such as off the road vehicles or other vehicles subjected to atmosphere having dust and other debris circulating within the air, the seals can abrade during use due to the debris which enters the seal assembly between the seal and the shaft. Prior seal assemblies developed to overcome this problem have included dust excluders that engage the shaft on the opposite side of the seal from the refrigerant chamber; however, this type of combined seal and dust excluder does not permit the seal assembly to be manufactured and sold without the dust excluder when the vehicle is not to be used in an environment that necessitates the dust excluder. Also, the seal and dust excluder of such a conventional design both engage the air compressor shaft at adjacent axial locations which can produce an undesirable heat buildup in the shaft.

Other seals and assemblies which have general utility or utility other than with vehicle air conditioning compressors so as not to be applicable to the present invention are disclosed by U.S. Pat. Nos. 2,272,650 von Veh; 3,320,006 Cozzarin; Re 31,058 Povejsil; and 4,465,285 Toyoda et al.

DISCLOSURE OF INVENTION

An object of the present invention is to provide an improved dust excluder for a seal assembly such as found in a vehicle air conditioning compressor.

In carrying out the above object and other objects of the invention, a seal assembly constructed in accordance with the present invention is primarily used in a vehicle air conditioning compressor including a housing defining a refrigerant chamber and also including a rotatable shaft that extends outwardly from the refrigerant chamber to permit rotational driving of the compressor. The seal assembly includes an annular support for mounting on the compressor housing with the shaft extending through the support. An annular seal of the assembly has an outer portion mounted by the annular support and has an inner portion for sealing with the shaft in a sliding relationship upon shaft rotation so as to thereby maintain refrigerant within the chamber. An annular dust excluder of the seal assembly has an inner portion for mounting the dust excluder for rotation with the shaft on the opposite side of the seal from the refrigerant chamber. This dust excluder also has an outer portion for engaging the annular support in a sliding relationship upon shaft rotation so as to exclude dust, debris, and other contaminants from entering the seal assembly and abrading the seal during use. With this construction, the sliding interfaces of the seal and the dust excluder are not both at the shaft as with conventional vehicle air conditioning compressor seals and dust excluders which can produce shaft heat buildup. Also, the seal assembly facilitates installation and use of the dust excluder when necessary without requiring its provision on vehicles that are not used in environments that have dust and debris which cause abrading of the seal.

In the preferred construction of the seal assembly, the dust excluder has its inner portion formed as an annular body having opposite axial ends located adjacent and remote from the refrigerant chamber. The outer portion of the dust excluder is formed as an annular sealing section that extends radially in an outward direction from the inner annular body at a location between its opposite axial ends. The outer sealing section of the dust excluder preferably includes a disc that extends outwardly from the inner annular body in a radial direction without any axial component. This outer annular sealing section of the dust excluder also preferably includes an annular sealing lip that extends radially in an outward direction from the disc with an axial inclination that facilitates flexing for engagement of the sealing lip with the annular support of the seal assembly. Most preferably, the sealing lip of the sealing section of the dust excluder is inclined away from the refrigerant chamber in an outward radial direction with respect to the rotatable shaft. The sealing section of the dust excluder preferably has an annular edge junction that defines an annular line contact for slidably sealing with the annular support of the seal assembly.

In the preferred construction, the dust excluder of the seal assembly includes a curved fillet that connects the annular body and the disc of the sealing section on the opposite side thereof as the refrigerant chamber so as to thereby provide reinforcement in the flexing of the sealing lip and the disc of the sealing section.

Mounting of the dust excluder on the vehicle air conditioning compressor shaft is preferably provided by an axially extending inner surface of the annular body that faces inwardly in a radial direction. This inner surface of the annular body preferably has an outwardly flared end toward the refrigerant chamber so as to facilitate insertion of the dust excluder over the shaft.

In the preferred construction of the seal assembly with which the dust excluder is utilized, the annular support has first and second annular seal clamping members between which the outer portion of the seal is clamped. One of the annular seal clamping members has an inwardly facing radial surface of an annular shape with which the sealing lip of the outer portion of the dust excluder seals in a sliding relationship so as to prevent dust and other debris from entering the seal assembly.

The objects, features, and advantages of the present invention are readily apparent from the following detailed description of the best mode for carrying out the invention when taken in connection with the accompanying drawings.

BEST MODE FOR CARRYING OUT THE INVENTION

With reference to FIGS. and 2 of the drawings, seal assembly generally indicated by 10 is constructed in accordance with the present invention with a dust excluder 12 made of a suitable seal material such as carboxylated nitrile with a construction that is hereinafter more fully described. Although seal assembly 10 is primarily intended for use in a vehicle air conditioning compressor, the seal assembly may also be used in any other application where fluid is to be sealed about a relatively rotating shaft. The dust excluder 12 is preferably formed without any rigid reinforcing member or members such as metal or plastic supports.

Figure 3:
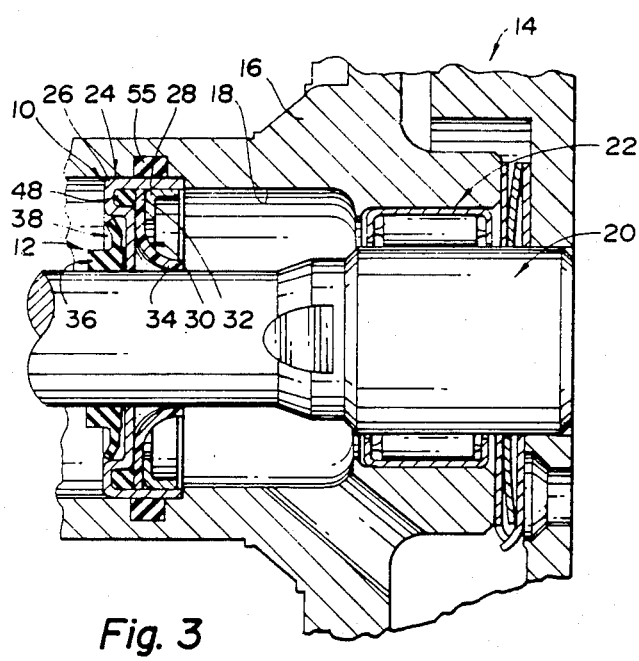
FIG. 3 is a sectional view of a vehicle air conditioning compressor with the seal assembly installed.

As illustrated in FIG. 3, the seal assembly 10 is utilized with a vehicle air conditioning compressor 14 including a housing 16 defining a refrigerant chamber 18. A rotatable shaft 20 of the compressor is supported for rotation on the housing 18 by an antifriction bearing 22 and extends outwardly from the refrigerant chamber 18 through the seal assembly 10 in order to maintain refrigerant and lubricating oil within the chamber 18 as the shaft 20 is driven by an external drive in order to provide operation of the compressor in a conventional manner.

Figure 1:
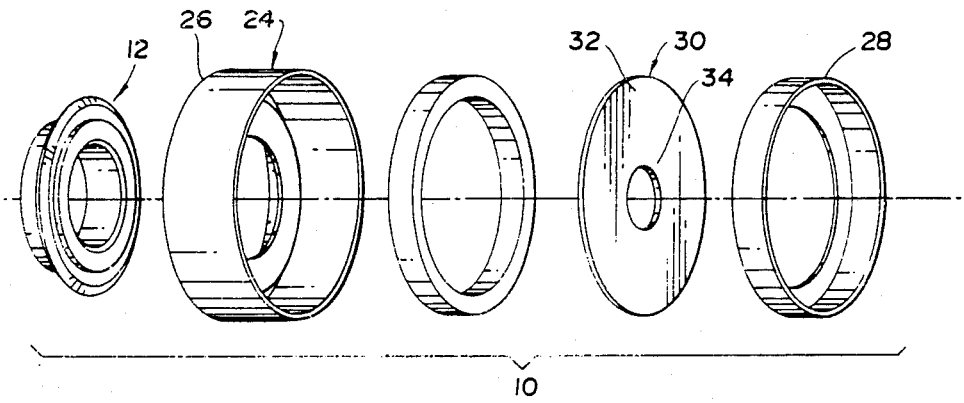
FIG. 1 is an exploded perspective view of a vehicle air conditioning seal assembly including a dust excluder according to the present invention.
Figure 2:
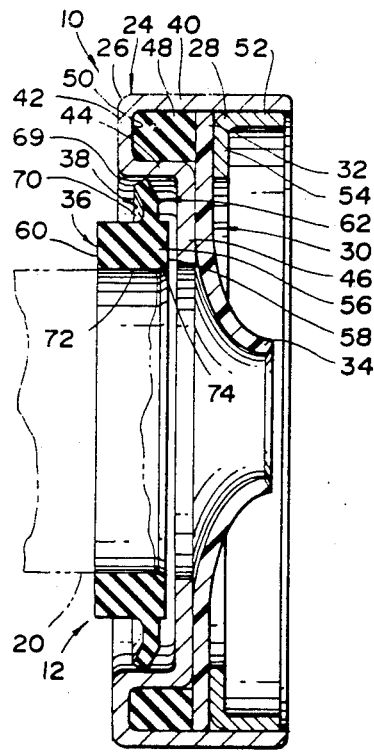
FIG. 2 is a cross sectional view of the seal assembly and dust excluder.

As shown in FIGS. 1 through 3, the seal assembly 10 includes an annular support 24 that is preferably constructed as first and second annular seal clamping members 26 and 28 as is hereinafter more fully described. An annular seal 30 of the assembly is preferably made of polytetrafluoroethylene (PTFE) or any suitable elastomeric or thermoplastic material and is preferably homogeneous in structure, i.e. the seal 30 is not formed with a metal case member as is common in conventional seals. This seal 30 has an outer portion 32 that is mounted on the annular support 24 in a clamped relationship between the annular seal clamping members 26 and 28. An inner portion 34 of the seal 30 seals with the shaft 20 in a sliding relationship upon shaft rotation so as to thereby maintain refrigerant within the chamber 18 shown in FIG. 3.

As illustrated in FIGS. 1 through 4, the dust excluder 12 of the seal assembly 10 has an inner portion 36 for mounting the dust excluder for rotation with the shaft 20 on the opposite side of the seal 30 as the refrigerant chamber 18 shown in FIG. 3. Dust excluder 12 also includes an outer portion 38 for engaging the annular support 24 in a sliding relationship upon shaft rotation so as to exclude dust and debris from entering the seal assembly and abrading the seal 30.

As best illustrated in FIG. 2, the annular support 24 of the seal assembly is constructed with its first annular seal clamping member 26 provided with an annular outer wall 40, an annular end wall 42 that projects radially inward from one end of the outer wall 40, an inner wall 44 that projects axially parallel to the outer wall 40, and an annular intermediate skirt 46 that projects radially inward from the inner wall 44 on the exterior side of the seal 30. An annular gasket 48 is received within a gasket groove 50 cooperatively defined by the outer wall 40, the end wall 42, and the inner wall 44 of the one seal clamping member 20 so as to seal against the outer portion 32 of seal 30. The other annular seal clamping member 28 has an outer wall 52 that is press fitted into the outer wall 40 of the seal clamping member 26 and has a clamping wall 54 that opposes the gasket seal 48 to clamp the outer portion 32 of seal 30. As shown in FIG. 3, an annular seal 55 seals between the seal assembly 10 and the compressor housing 14 at the outer wall 40 of the support seal clamping member 26.

Figure 4:
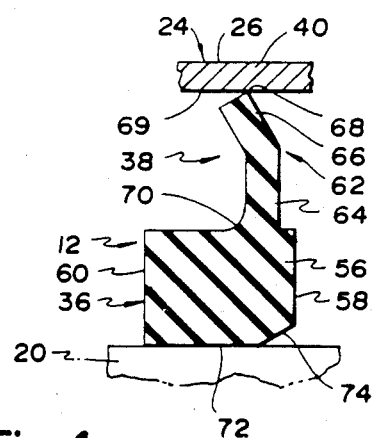
FIG. 4 is an enlarged partial view of the dust excluder taken in cross section as a FIG. 3.

As shown in FIGS. 2 through 4, the dust excluder 12 preferably has its inner portion 36 formed as an annular body 56 having opposite first and second axial ends 58 and 60 respectively located adjacent and remote from the refrigerant chamber of the compressor with respect to each other. The outer portion 38 of the dust excluder 12 is preferably formed as an annular sealing section 62 that extends radially in an outward direction from the inner annular body 56 at a location between its inner and outer axial ends 58 and 60.

As best illustrated in FIG. 4, the outer annular sealing section of the dust excluder 12 preferably includes a disc 64 that extends outwardly from the inner annular body 56 in a radial direction without any axial components. At the outer periphery of the disc 64, the outer annular sealing section 62 includes an annular sealing lip 66 that extends radially in an outward direction from the disc with an axial inclination. This sealing lip 66 of the sealing section 62 of the dust excluder is inclined toward the remote axial end 60 of the annular body 56 away from the adjacent axial end 58 in an outward radial direction with respect to the rotatable shaft. Such an inclination provides flexing of the sealing lip 66 in order to maintain its sliding engagement in a sealed relationship with the annular support 24. The sealing lip 66 preferably has an annular edge junction 68 that defines an annular line contact for providing the sliding seal with an inwardly facing surface 69 of the inner wall 44 of the seal clamping member 26 of the annular support 24.

As also best illustrated in FIG. 4, the dust excluder 12 includes a curved fillet 70 that connects the annular body 56 and the disc 64 of the sealing section 62 on the opposite side thereof as the axial end 58 of the annular body. This curved fillet 70 provides support to the sealing section 62 upon flexing thereof as its sealing lip 64 is deflected upon assembly and during use with its annular line contact with the inwardly facing surface of the annular support.

Installation of the dust excluder 12 can be performed either with the rest of the seal assembly 10 or subsequently as may be more convenient for the particular air conditioning compressor involved. The annular body 56 of the dust excluder has an axially extending inner surface 72 that faces inwardly in a radial direction as shown in FIG. 4 and has an outwardly flared end 74 adjacent the axial end 58 of the annular body. This flared end 74 of the inner surface 72 facilitates the insertion of the dust excluder by radial stretching over the air compressor shaft 20 regardless of whether the dust excluder installation is performed with the rest of the seal assembly 10 or subsequently. The stretching of the dust excluder over the air compressor shaft 20 creates a radially directed inward force which secures and anchors the dust excluder to the shaft.

In summary, the dust excluder 12 prevents dust and other debris from entering the seal assembly 10 and abrading the seal 30 at its inner portion 34 which slidably engages the rotatable air compressor shaft 20 as previously mentioned. Furthermore, the slidable engagement of the dust excluder 12 with the annular support 24 of the seal assembly prevents additional heating of the compressor shaft 20 as is the case with prior seal and dust excluder constructions wherein there are dual sliding interfaces with the shaft. Furthermore, the design of the present dust excluder 12 facilitates its use only when necessary since the seal assembly is readily adaptable for use without the dust excluder if the vehicle is not to be used in an environment where dust and debris are likely to cause seal abrasion.

While the best mode for carrying out the invention has been described in detail, those familiar with the art to which this invention relates will recognize various alternative designs and embodiments for carrying out the invention as defined by the following claims.

I claim:

1. A seal assembly for use in a vehicle air conditioning compressor including a housing defining a refrigerant chamber and also including a rotatable shaft that extends outwardly from the refrigerant chamber, the seal assembly comprising: an annular support for mounting on the compressor housing with the shaft extending through the support, said support having an axially-extending wall portion; an annular seal having an inner portion for sealing with the shaft in a sliding relationship upon shaft rotation so as to thereby maintain refrigerant within the chamber; and an annular dust excluder having an inner portion for mounting the dust excluder for rotation with the shaft on the opposite side of the seal from the refrigerant chamber, and the dust excluder having an outer portion engaging said axially-extending wall portion of the annular support with a sliding relationship upon shaft rotation so as to exclude dust and other debris from entering the seal assembly and abrading the seal.

2. A seal assembly as in claim 1 wherein the dust excluder has its inner portion formed as an inner annular body having opposite axial ends, and the outer portion of the dust excluder being formed as an annular sealing section that extends radially in an outwardly direction from inner annular body at a location between its opposite axial ends.

3. A seal assembly as in claim 2 wherein the outer annular sealing section of the dust excluder includes a disc that extends outwardly from the inner annular body in a radial direction without any axial component, and the outer annular sealing section of the dust excluder also including an annular sealing lip that extends radially in an outward direction from the disc with an axial inclination.

4. A seal assembly as in claim 3 wherein the sealing lip of the sealing section of the dust excluder is inclined away from the refrigerant chamber in an outward radial direction with respect to the rotatable shaft.

5. A seal assembly as in claim 4 wherein the sealing lip of the dust excluder has an annular edge junction that defines an annular line contact for slidably sealing with the annular support of the seal assembly.

6. A seal assembly as in claim 5 wherein the dust excluder includes a curbed fillet that connects the annular body and the disc of the sealing section on the opposite side thereof as the refrigerant chamber.

7. A seal assembly as in claim 6 wherein the inner annular body of the dust excluder has an axially extending inner surface that faces inwardly in a radial direction and has an outwardly flared end adjacent the refrigerant chamber for facilitating insertion of the dust excluder over the shaft.

8. A seal assembly for use in a vehicle air conditioning compressor including a housing defining a refrigerant chamber and also including a rotatable shaft that extends outwardly from the refrigerant chamber, the seal assembly comprising: an annular support for mounting on the compressor housing with the shaft extending through the support; the annular support having first and second annular seal clamping members; one of the annular seal clamping members having an inwardly facing radial surface of an annular shape; an annular seal having an outer portion mounted between the clamping members of the annular support; the annular seal also having an inner portion for sealing with the shaft in a sliding relationship upon shaft rotation as to thereby maintain refrigerant within the chamber; and an annular dust excluder having an inner portion including an annular body for mounting the dust excluder for rotation with the shaft on the opposite side of the seal from the refrigerant chamber, the annular body having opposite axial ends, the dust excluder also having an outer portion including a sealing section having a disc that extends outwardly form between the opposite axial ends of the annular body, the sealing section also having a sealing lip that is inclined away from the refrigerant chamber in an outward radial direction with respect to the rotatable shaft, and the inclined sealing lip having an annular edge junction that defines an annular line contact sealing with the inwardly facing axially-extending wall surface of one annular seal clamping member of the annular support in a sliding relationship upon shaft rotation so as to exclude dust and other debris from entering the seal assembly and abrading the seal.

9. A seal assembly for use in a housing defining a chamber and also including a rotatable shaft that extends outwardly from the chamber, the seal assembly comprising:

an annular support for mounting on the housing with the shaft extending through the support, said support having an axially-extending wall portion;

an annular seal having an inner portion for sealing with the shaft in a sliding relationship upon shaft rotation so as to seal the chamber; and an annular dust excluder having an inner portion for mounting the dust excluder for rotation with the shaft on the opposite side of the seal from the chamber, and the dust excluder having an outer portion engaging said axially-extending wall portion of the annualar support with a sliding relationship upon shaft rotation so as to exclude dust and other debris from entering the seal assembly and abrading the seal.

* * * * *